Aug. 1, 1961     W. A. STREHLOW     2,994,613
METHOD OF PREPARING AND COOKING POTATOES
Filed June 7, 1954
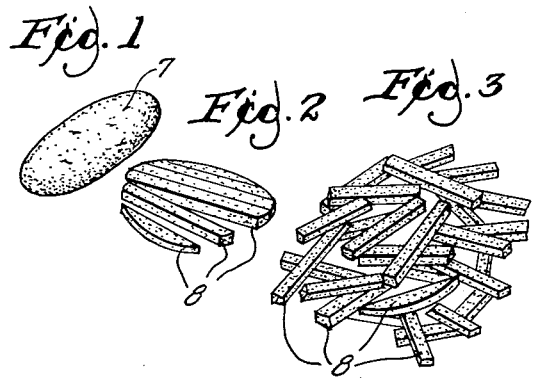
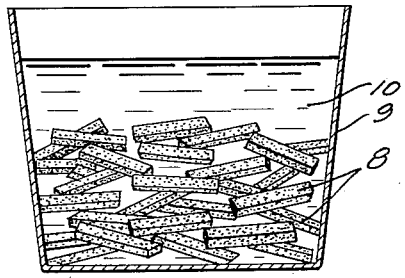
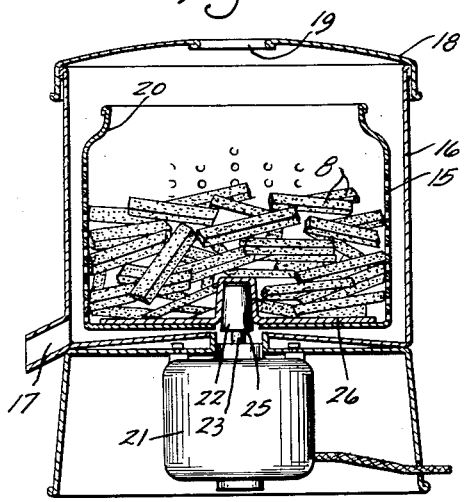
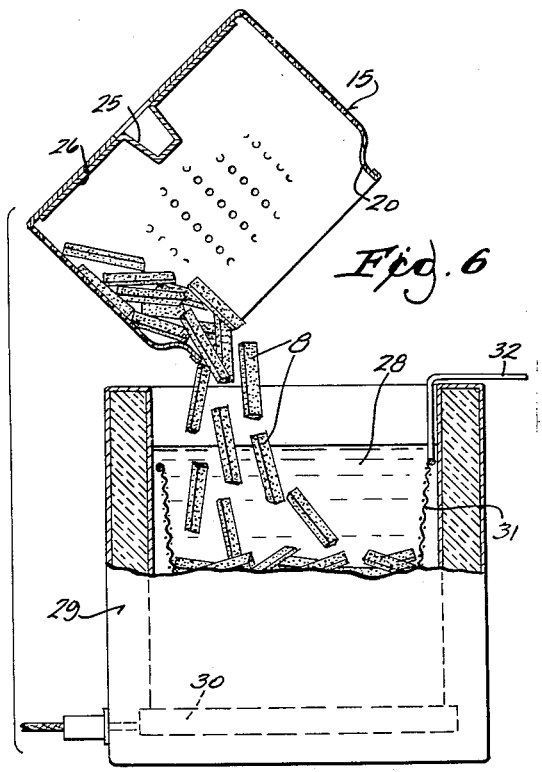
INVENTOR.
WILLIAM A. STREHLOW
BY
Wheeler, Wheeler + Wheeler
ATTORNEYS

United States Patent Office 2,994,613
Patented Aug. 1, 1961

2,994,613
METHOD OF PREPARING AND COOKING POTATOES
William A. Strehlow, 124 Oak St., Juneau, Wis.
Filed June 7, 1954, Ser. No. 434,932
4 Claims. (Cl. 99—100)

This invention relates to a method and apparatus for preparing and cooking vegetables, fruits and the like.

The invention will be described with particular reference to the preparation of French fried potatoes. The potato is cut into small strips or other pieces and stored in water in the usual way. In ordinary practice excess water is removed from the surface of the potato strips by manipulating the pieces of vegetables on a towel. This is not only unsanitary but ineffective. It does not even remove all of the surface water. In consequence, substantial quantities of water, some of which is in the fiber of the vegetable close to its surface, is transferred with the vegetable into the cooking fat where it is boiled off, causing considerable ebullition and resulting in two undesirable results not previously appreciated, namely, the emulsification of some of the water with the fat and the replacement of some of the water with fat within the fiber of the vegetable.

The emulsification of the water in the cooking fat reduces the boiling point of the fat and makes it impossible to maintain the fat at proper cooking temperatures. This also results in excessive absorption of fat by the vegetable, thus aggravating the absorption which results when water within the vegetable is driven off in the kettle. The cooking time becomes excessively long, the fat requires more frequent replacement and the French fried vegetables become excessively fatty and less tasty than when prepared according to the present invention.

In accordance with the present invention, the vegetable strips removed from water soaking are placed in a centrifuge specially designed for the purpose and are rotated at high speed to drive off not only the surface water but any excess of uncombined internal water which the vegetables may have picked up during soaking. After centrifuging, the vegetables are removed from the centrifuge and placed in the fat for cooking in the usual manner.

Vegetables so cooked have been found to be crisper, better browned, and relatively free of fat as compared with vegetables prepared by previously known processes. Moreover, I find that the fat can be used for at least twice as long a period before requiring replacement, thus saving greatly in the expense of preparation.

I am aware of the fact that vegetable food material has been centrifuged heretofore but, so far as I am aware, it has never been centrifuged for the purposes of deep fat frying nor has the desirability of removing water to this extent been recognized nor have the very substantial savings and improvement of product as hereindescribed been achieved by any prior process known to me.

In the drawings:

FIG. 1 is a view in perspective of a potato.

FIG. 2 shows in perspective a slice of potato cut into strips.

FIG. 3 shows in perspective a pile of potato strips prepared for treatment.

FIG. 4 is a view in cross section through a water filled vessel in which potato strips are stored.

FIG. 5 is a view in cross section through a centrifuge specially designed for the purposes of the present invention.

FIG. 6 is a view partially in side elevation and largely in cross section showing vegetable slices being dumped from the centrifuge basket into a deep fat frier and fried therein in accordance with this invention.

As explained above, the deep fat frying of potatoes is selected as an exemplification of the invention because it is particularly common to prepare potatoes by deep fat frying. The potato 7 is prepared in any usual or desired way. FIG. 2 shows that a slice of potato has been cut into strips 8. FIG. 3 shows similar strips piled in readiness for storage in a container 9 under the surface of a body of water 10. It is common to store potatoes and other fruits and vegetables in this manner to avoid surface oxidation.

By the time the potatoes are removed from storage under the surface of the water shown at 10 they will not only be superficially coated with water but will have absorbed water which is contained within and between the potato fiber but is free water as distinguished from water in chemical composition. I have discovered the importance of removing this absorbed water as well as superficial water. To this end, I put the potato pieces 8 into the basket 15 of a centrifugal separator and rotate the basket at high speed within the casing 16. An outlet from the casing is provided at 17 for the discharge of water and also for the discharge of air, the use of which plays an important part in the drying of the food material.

Because the casing 16 is of circular cross section, the air within it is set in motion by the high speed rotation of basket 15. This creates a considerable head of air around the inner periphery of the casing. The closure 18 prevents the air from escaping upwardly. Hence the air moves outwardly at high speed through the discharge port 17 with the water, being replaced by additional air which enters the casing through the centrally disposed inlet opening 19 in the top.

The basket 15 has openings throughout most of the height of its side walls but is formed inwardly at 20 around its mouth so that the potatoes and water can not escape upwardly during the rotation of the basket. The potatoes are retained and the water escapes through the foraminous side walls into the casing 16. Except for the somewhat restricted mouth of the basket, the whole top of the basket is open to receive the atmospheric air admitted through the port 19 and this air moves outwardly through the potatoes and through the foraminous side walls of the basket to facilitate the drying process.

When the drying is complete, which takes only a very short period, the basket 15 is lifted bodily from the casing 16 with its full load of dried food slices. This is made possible because of the special design of the dehydrator equipment. The powerful motor 21 is provided with a driving cone 22 upon its armature shaft 23 and the bottom of the basket 15 has a complementary socket 25 formed in a plate 26 attached to the bottom of the basket.

Accordingly, no mounting of the basket is required other than to drop it into position within the casing. It is self-centering and immediately establishes a driving clutch connection with the armature shaft. Yet for dumping the content of vegetable or fruit, the basket may be removed without tools by simply lifting it from the receptacle whereupon it may be inverted as shown in FIG. 6 to drop the dehydrated material into the bath of hot fat shown at 28 in the deep fat frier 29. In accordance with conventional practice this may be heated by an electrical resistance element at 30 and it may have a woven wire liner 31 provided with handle 32 for removing the material after cooking.

As above stated, the cooking is greatly accelerated over the period for which the fat is used. Whenever fat is used for deep fat frying its boiling point tends to decrease steadily over the period of use. I have discovered that this is the result, in substantial part, of the free water content of the material cooked therein. The drier the material, the longer it will be before the boiling point becomes so low as to require replacement of the fat. It should be explained that there is no absolute lower limit at which the fat is usable. Some cooks continue to use the fat even when its boiling point is so low that the cooking time is substantially doubled and an excessive amount of fat is picked up by the material cooked. It is considered to be the best practice to conduct the cooking operation at a relatively high temperature of about 400° F. to minimize cooking time and to minimize fat absorbed by the material cooked. In accordance with this practice the fat would be replaced when it is no longer possible to maintain cooking temperature at the stated value. Whatever value is selected, it is found that through the use of the present invention the fat may be used approximately twice as long before its boiling point drops below that value. At the same time, the product will be greatly superior not only because the boiling point is maintained but because, as I believe, the water is extracted in advance. As nearly as I can determine, the act of boiling out free water from the material cooked during the cooking operation leaves voids within the material in which the fat enters to replace the water. Thus my process results in a saving of volume of cooking fat as well as minimizing the number of replacements required.

I claim:

1. In a method of deep fat frying cut pieces of potato, which method comprises the step of subjecting the potato to high speed centrifugal discharge of its uncombined internal and external water content preliminary to frying.

2. A method of deep fat frying following storage of cut pieces of potato in water, such method comprising the step of centrifugal discharge of uncombined internal and external water from the potato without change of its physical form after removal from the water and subsequently frying the substantially water-free potato at temperatures substantially in excess of the boiling point of water.

3. In a method of preparing potatoes for eating, which method comprising cutting such potatoes into pieces, storing the pieces in water for a period during which some of the water enters the potatoes, the steps of, thereafter expelling surface water and water which has entered the potato pieces by centrifuging the potato pieces and finally frying the pieces of potato pieces in deep fat at temperatures materially in excess of the boiling point of water and in substantial absence of contained water such as might otherwise boil from the potato pieces and leave openings into which the fat might enter.

4. The method recited in claim 3 including the further step of passing air over the potato pieces during the centrifuging thereof.

References Cited in the file of this patent
UNITED STATES PATENTS

| | | |
|---|---|---|
| 1,394,743 | Duke | Oct. 25, 1921 |
| 1,542,771 | Hills | June 16, 1925 |
| 1,848,785 | Jung | Mar. 8, 1932 |
| 2,059,191 | Altpeter | Nov. 3, 1936 |
| 2,490,431 | Greene et al. | Dec. 6, 1949 |
| 2,512,591 | Alexander | June 27, 1950 |
| 2,589,591 | Xander | Mar. 18, 1952 |
| 2,611,705 | Hendel | Sept. 23, 1952 |
| 2,705,679 | Griffiths et al. | Apr. 5, 1955 |
| 2,715,869 | Salvo | Aug. 23, 1955 |

OTHER REFERENCES

"Everybody's Cook Book," Lord, page 768.